Figure 7:
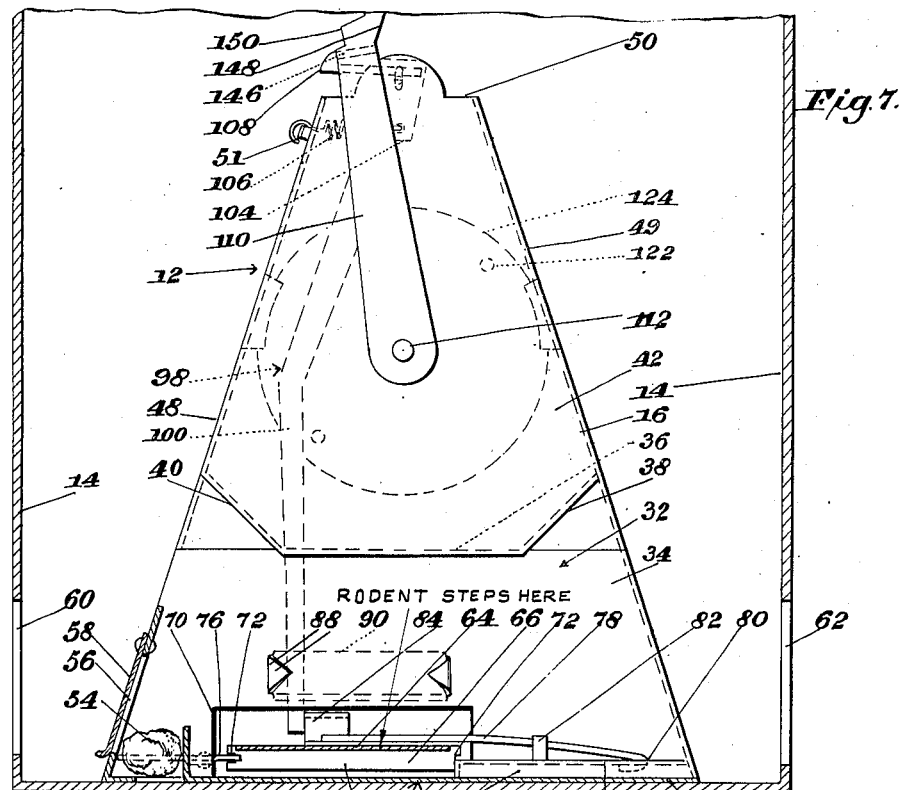

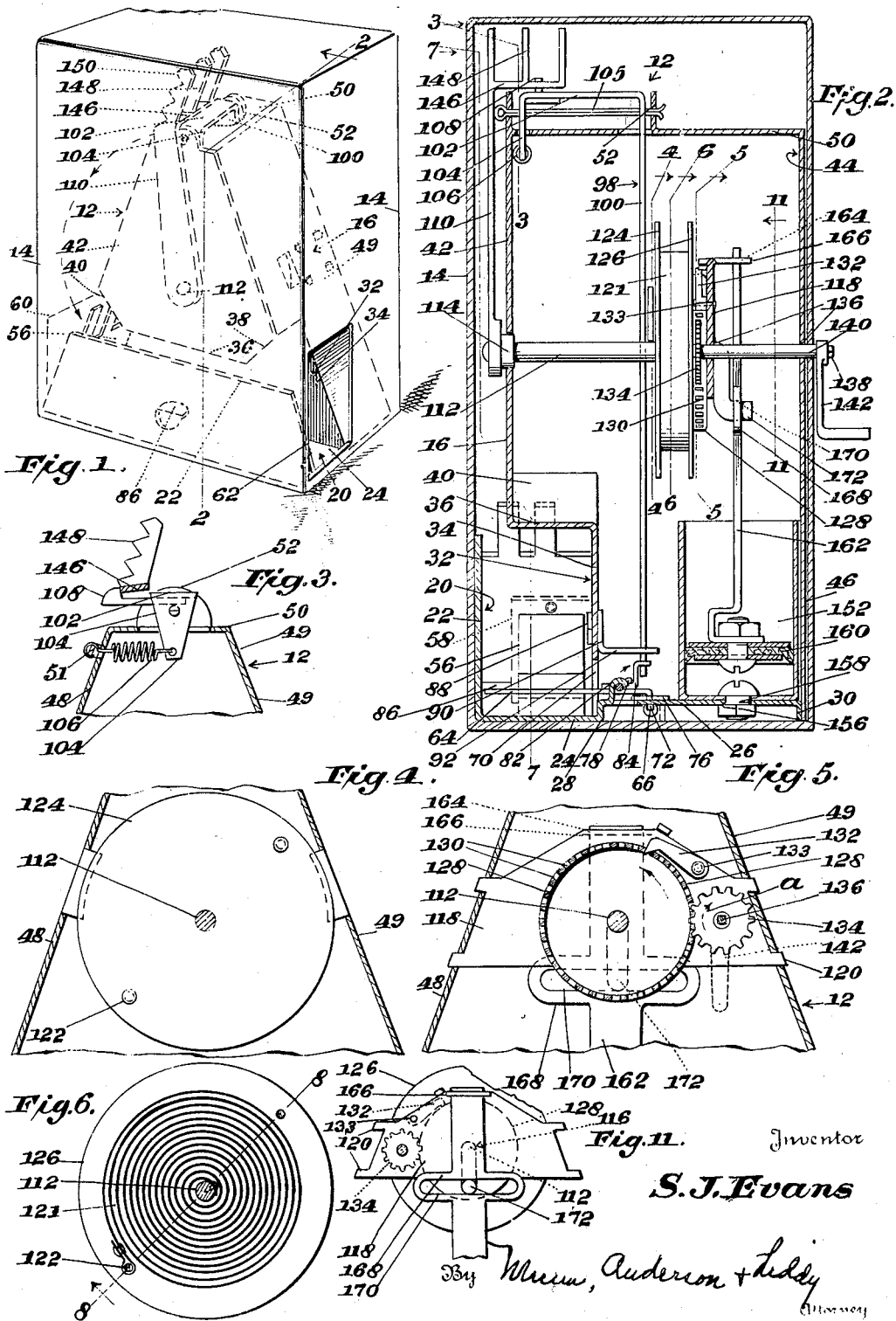

Sept. 16, 1941. S. J. EVANS 2,256,048
ANIMAL TRAP
Original Filed April 27, 1936 2 Sheets-Sheet 2

RODENT STEPS HERE

Inventor
S. J. Evans.
By Munn, Anderson & Liddy
Attorneys

Patented Sept. 16, 1941

2,256,048

UNITED STATES PATENT OFFICE 2,256,048

ANIMAL TRAP

Samuel J. Evans, Princeton, W. Va.

Refiled for abandoned application Serial No. 76,668, April 27, 1936. This application August 1, 1939, Serial No. 287,855

6 Claims. (Cl. 43—75)

The improved animal trap comprising the present invention is primarily adapted for use in disposing of small animals such as rats or mice, although the trap may, if desired, be designed for use in connection with larger prey.

It is an object of the invention to provide a trap of the automatic resetting type described and claimed in application, Serial No. 76,668, filed April 27, 1936, for Animal traps, allowed September 15, 1938.

Another object of the invention is the provision of a trap which, while capable of easy springing by an animal, may be handled with little danger of its being sprung accidentally, and which if so sprung, offers no danger to the fingers or hands of the user. Ancillary to this object is the provision of a safety trap in which the operative parts thereof are concealed from view in such a manner that the trap may be handled without the anticipation of springing, thus eliminating the fear of handling that is ordinarily present in connection with the setting of ordinary traps. Still another associated object is the provision of a trap which, if accidentally sprung, will automatically reset itself.

A further object of the invention is to provide a trap which, like the trap disclosed in the above-mentioned application, is designed to strike the animal, knock it away from the trap and immediately reset itself automatically, but which delivers a more effective blow upon the animal in a sweeping downward and horizontal direction, thus reducing any tendency for the animal to be carried into the trap to clog the operative mechanism thereof, while at the same time incorporating additional means for facilitating the ejection of the animal from the trap.

Yet another object of the invention is the provision of a trap which in its general organization is made up of eight sheet metal stampings which are easily assembled together, thus contributing to economy of manufacture under conditions of mass production.

The provision of a trap which, although constructed of light sheet metal, is rugged and durable, one which is cushioned against the impact of springing and is therefore unlikely to get out of order, and one which may be set for repeated operation and which will require no further attention are further desirable features that have been borne in mind in the production and development of the present invention.

Figures 8, 9, 10:
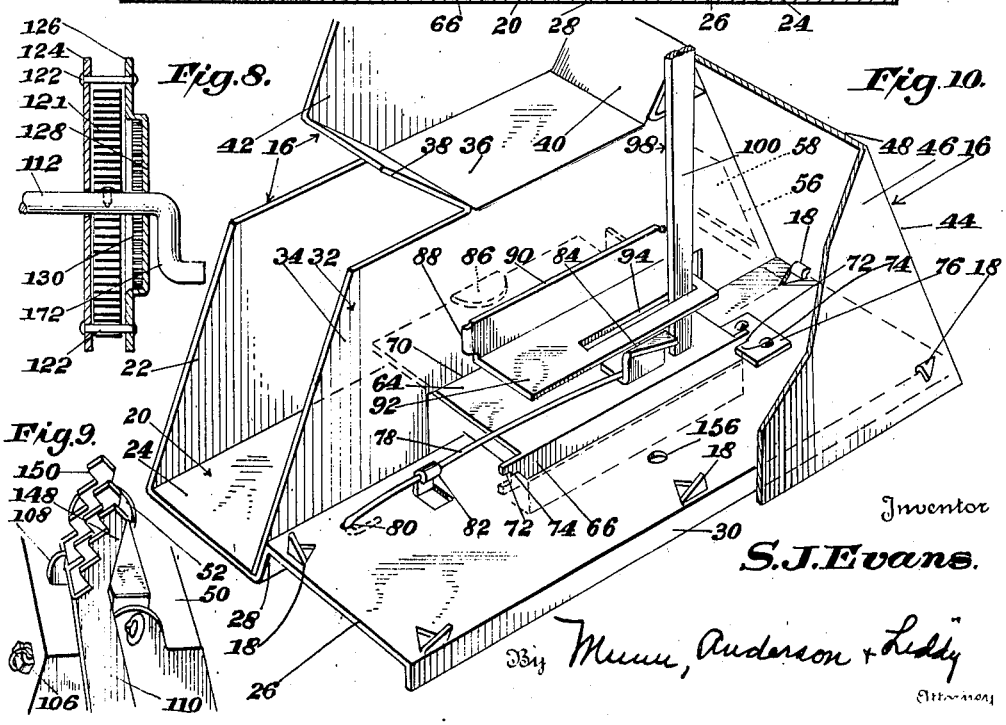

With these and other objects in view which will become more readily apparent as the nature of the invention is better understood, the same consists in the novel construction, combination and arrangement of parts shown in the accompanying two sheets of drawings, in which:

Figure 1 is a perspective view showing the assembled trap in operative position within its protecting carton or wrapper, Figure 2 is a sectional view taken substantially along the plane 2—2 of Figure 1, Figure 3 is a sectional view taken substantially along the line 3—3 of Figure 2, Figure 4 is a sectional view taken substantially along the line 4—4 of Figure 2, Figure 5 is a sectional view taken substantially along the line 5—5 of Figure 2, Figure 6 is a sectional view taken substantially along the line 6—6 of Figure 2, Figure 7 is a sectional view taken substantially along the line 7—7 of Figure 2, Figure 8 is a sectional view taken substantially along the line 8—8 of Figure 6, Figure 9 is an enlarged fragmentary perspective view of a striking arm employed in connection with the present invention, Figure 10 is a fragmentary perspective view showing and disclosing the operation of a treadle mechanism employed in connection with the present invention with a slightly modified form of the trap casing, and Figure 11 is a sectional view taken substantially along the line 11—11 of Figure 2.

In all of the above described views, like characters of reference are employed to designate like parts throughout.

The trap assembly is designated in its entirety by the reference numeral 12 and is shown in Figure 1 as being enclosed within a carton or container 14 which, in the position shown, is designed for use with the trap both to conceal the same and to protect the hands of the user from possible injury resulting from springing of the trap. This carton 14 may if desired be discarded and the function of the trap assembly 12 will remain unaltered. However its use in connection with the trap in the manner to be subsequently set forth is recommended and throughout this specification and in the claims, the carton will be treated as an operative element of the trap construction.

The trap casing 16 is of irregular design although it is generally of trapezohedral formation and consists of a plurality of sheet metal sections suitably secured together by tongue and slot connections 18 struck from the metal thereof. The section which provides the trap base consists of an integral sheet metal section 20 having a vertical wall 22 (see Fig. 2); a base 24, an offset portion 26 slightly elevated from the base; a web portion 28 connecting the base and offset portion; and a downwardly extending flange 30, the lower edge of which terminates in the plane of the base 24.

Suitably secured to the web portion 28 of the section 20 is a second sheet metal section 32 having a centrally located vertically extending wall 34 substantially in the plane of the web 28; a horizontal portion or shelf 36 from which there extends a pair of upwardly inclined oppositely directed portions 38 and 40; and a vertically extending wall 42 which terminates above the upper end of the casing 16. In Fig. 10, the members 26, 28, 22, 24 and 30 are of integral formation.

A third sheet metal section 44 (see Fig. 2) suitably secured to the other sections completes the trapezohedral casing 16 and consists of a vertically extending wall 46 which lies substantially in the plane of the flange 30; an inclined portion 48 providing a rear wall for the casing an inclined portion 49 providing a front wall for the casing which terminates adjacent the vertical wall 34; a horizontally extending portion 50 (see Fig. 2) providing a top for the casing 16; and a vertically extending flange or ear 52 parallel to the wall 42 of the sheet metal section 32.

The bait 54 is positioned in the base 24 adjacent the rear wall 48 and between the vertical walls 22 and 34. To facilitate insertion or removal of the same, a bait opening 56 provided with a pivoted closure 58 is provided in the wall 48 and the carton 14 is provided with a similar opening 60 in alignment therewith.

The attracted animal in attempting to get at the bait 54 enters the trap through an opening 62 provided in the wall of the carton 14 opposite the bait opening 60 and proceeds toward the bait in the unobstructed channel provided between the vertical walls 22 and 34. In so doing, he steps upon a treadle 64 which is pivoted in the offset portion 26 of the sheet metal section 20. The treadle 64 is in the form of a flat plate which extends through an opening 70 provided in the vertical wall 34. One end of the treadle 64 is turned downwardly to provide an attachment flange 66. The opposite ends of this flange 66 are provided with slots 72 that interlock with similar slots 74 provided in the body of the offset portion 26 and in a removable plate 76 provided for the purpose of facilitating assembly of the treadle 64 in its pivoted position. The interlocking slots 72, 74, provide a knife edge pivot for the treadle 64. The treadle 64 normally occupies an elevated parallel position with respect to the base 24 and toward this end an elongated spring finger 78 anchored in the offset portion 26 as at 80 and 82, bears laterally against a lug or trigger member 84 carried by the treadle 64 above the plane of the pivotal points 72, 74, while a limit stop in the form of an ear 86 struck from the vertical wall 22 serves to limit the upward movement of the treadle 64.

Suitably secured to the vertical wall 34 as, for example, by means of tongue and slot connections 88, is an angle bracket 90 having a horizontal portion 92 provided with a slot 94 through which there extends a release rod 98 having an elongated depending portion 100. The upper end of this release rod is bent laterally as at 102 (see Fig. 2) and downwardly as at 104 to provide a short depending arm parallel to the elongated depending portion 100. The portions 100, 104 are supported upon a cotter or other pin 105 which is mounted between the ear 52 and the terminal of the wall 42. The release rod 98 is suspended by and oscillates on this pin. A coil spring 106 (see Fig. 3) having one end secured to the wall 48 as at 51 has its other end secured to the depending arm 104 and serves to retract the pivoted release rod 98 rearwardly to the extreme position shown in Fig. 10. The lateral portion 102 of the release rod 98 carries a latch member 108, designed to catch and hold the upper end of a swinging combination animal-striking and ejecting arm 110 now to be more fully described.

The destructive animal-striking and ejecting arm 110 is (see Fig. 2) mounted for swinging movement outside the vertical wall 42 upon a shaft 112 which is supported horizontally in the casing 16 in a bearing 114 provided in the wall 42 and in a bearing 116 provided in a transverse vertically extending plate 118 secured by means of tongues 120 (see Fig. 5) to the inclined walls 48 and 49.

The shaft 112, together with the swinging arm 110 carried thereby, is designed to rotate in the direction indicated by the arrows in Figure 1, and toward this end a coil spring 121 (see Figs. 6 and 8) has its inner end anchored to the shaft 112 and its outer end anchored to one of a series of pins 122 extending between a pair of spaced discs 124 and 126 loosely mounted on the shaft 112. The disc 126 is provided with an annular central offset portion 128 (see Figs. 2 and 5), the periphery of which is provided with a plurality of spaced rectilinear slots 130, thus converting this offset portion, which may be inexpensively stamped from the metal of the disc, into a gear. A pawl 132, pivoted at 133 to the plate 118 engages the teeth formed by the slots 130 to prevent rotation of the discs 124 and 126 in one direction. A gear 134 carried by a shaft 140 which is rotatably mounted as at 136 on the plate 118 and the wall 46, meshes with the gear provided by the offset portion 128. The shaft 140 is provided with a square end 138 adapted to removably receive thereon a crank 142. Thus it will be seen that turning movement of the crank 142 in the direction permitted by the pawl 132 (arrow a, Fig. 5) will cause the spring 120 to become wound. This spring when wound, will urge the shaft 112, together with the arm 110 thereon, to rotate in the direction indicated by the arrows in Figure 1.

The combined animal-killing and ejecting arm 110 is preferably in the form of a relatively heavy rod having a laterally extending portion 146 adapted to be engaged by the latch 108 and normally held thereby, and from which there extends a plurality of spaced parallel striking members 148 having teeth 150 (see Figs. 7 and 9) formed thereon. These toothed members 148 are slightly inclined to the longitudinal axis of the arm 110 in order that the animal on the treadle 64 may be struck a descending blow that will be effective in killing it. The treadle 64 is in the path of the toothed members which are designed to deliver a crushing penetrating blow to the animal that will immediately kill it and eject it bodily from the trap while at the same time impelling it a sufficient distance therefrom so as not to clog the entrance or opening 62. The upwardly inclined portion 38 provided on the sheet metal section 32 of the casing 16 not only permits the horizontal portion 146 of the swinging arm 110 to clear the casing but also provides a clear unobstructed opening for ejection of the animal, thus insuring that the body of the animal will not be carried around the arm 110 to clog the operation of the device.

After the arm 110 has delivered its destructive blow to the animal and caused it to be removed from the trap, it continues in its swinging movement upwardly until its movement is arrested by the latch 108. In order to dampen the impact of this arm against the latch 108 and prevent sudden impact of the horizontal portion 146 against this relatively delicate member, a dashpot arrangement, best illustrated in Figure 2 is provided for retarding the last half cycle of movement of the arm 110.

Accordingly, a dashpot cylinder 152 is secured at its bottom to the offset portion 26 of the sheet metal section 20 by means of a nut and bolt assembly 158, a hole 156 extending through the offset portion 26 being provided for this purpose. Mounted for reciprocation within the cylinder 152 is a plunger 160 of the cup leather washer type designed to have unimpeded freedom of movement upwardly, but restricted in its downward movement by the entrapped air therebeneath. A connecting rod 162 has its lower end connected to the plunger 160 and the upper end thereof is guided in a slot 164 provided in a bracket 166 formed on the plate 118. Medially of the connecting rod 162 there is formed an enlarged portion 168 functioning as a crosshead and having a slot 170 extending therethrough, through which slot an offset end or crank 172 of the shaft 112 extends.

From the above arrangement of parts it will be seen that when the animal depresses the treadle 64 and the trigger member 84 is moved to one side to permit the release rod 98 to move forwardly due to the strong impelling action of the arm 110 on the latch 108 which completely overpowers the action of the coil spring 106, this arm descends in the manner previously described to deliver its blow upon and eject the animal from the trap. Simultaneously the unimpeded plunger 160 will move upwardly with a quick stroke. As the arm 110 continues in its upward movement to complete the last half cycle of its stroke, the plunger 160, acting through the connecting rod 162 and eccentric crank 172, will retard the movement of the arm 110 until the same is stopped by the latch 108 which has meanwhile resumed its original position due to the action of the spring 106 which is no longer overpowered by the stronger force exerted by the arm 110.

Similarly, if in handling, the trap is accidentally sprung, although this is not likely, no inconvenience is encountered for the trap immediately resets itself in the manner just described. Inasmuch as there are no exposed moving parts, the hands of the user are not endangered. Indeed, he may well be unaware that such springing has occurred.

The invention is not to be limited to the exact arrangement of parts shown in the accompanying drawings or described in this specification as various changes in the details of construction may be resorted to without departing from the spirit of the invention. For example while the various sheet metal sections disclosed are shown as being connected together by the tongue and slot devices 18, it may be found expedient to spot weld these parts together. Other sheet metal sections of irregular design may be employed providing they offer to the trap casing 16 the necessary supporting structure for the treadle mechanism, the striking arm, and their associated parts. Only in so far as the invention has particularly been pointed out in the accompanying claims is the same to be limited.

I claim:

1. In an animal trap, an animal operated treadle comprising a plate adapted to occupy a substantially horizontal elevated position above said base, a flange formed on said plate having slots formed in the ends thereof, there being slots in said base interlocking with said first-mentioned slots, said interlocking slots providing a knife edge pivotal support for said treadle, and spring means for maintaining said plate in elevated position.

2. In an animal trap, an animal operated treadle comprising a plate adapted to occupy a substantially horizontal elevated position above said base, a flange formed on said plate having slots formed in the ends thereof, said base being provided with slots interlocking with said first mentioned slots, said interlocking slots providing a knife edge support for said treadle, said base being provided with a removable portion in which one of the slots thereof is formed, and spring means for maintaining said plate in elevated position.

3. An animal trap comprising a casing adapted to be entered by an animal, the casing having an offset portion and a chamber below the offset portion, a spring-actuated arm having one end pivotally mounted at one side of the offset portion, the casing having a passage opening into the chamber, said arm having a lateral projection movable over the offset portion and through the chamber with the free end of the arm being movable through the passage, said projection adapted to strike an animal in said chamber a descending blow and eject the same from the chamber, means for holding said arm in poised elevated position, and an animal-operated treadle positioned in the path of movement of said arm for releasing said holding means to permit said arm to descend upon the animal and deliver its blow.

4. An animal trap comprising a casing adapted to be entered by an animal, the casing having an offset portion and a chamber below the offset portion, a spring actuated arm having one end pivotally mounted at one side of the offset portion, the casing having a passage opening into the chamber, said arm having a lateral toothed projection movable over the offset portion and through the passage, said projection adapted to strike an animal in said chamber a descending blow and eject the same from the chamber and return to its original position, means for holding said arm in poised elevated position, and an animal-operated treadle positioned in the path of movement of said arm for releasing said holding means to permit said arm to descend and deliver a blow upon the animal by the toothed projection, said holding means being adapted to arrest the movement of said arm upon return of the same to its original position, the upper edge of the outer side wall of the chamber being spaced from the lower end of the offset portion to provide the passage for the movable arm.

5. An animal trap comprising a casing having a lateral offset portion, a shaft mounted in the offset portion and projecting beyond the offset portion, a motor in the casing for revolving the shaft, an arm having one end secured to the projecting end of the shaft, a lateral projection on the free end of the arm and extending over the offset portion and adapted to be moved around the offset portion, means for releasably retaining the arm in an elevated poised position, the casing having an animal receiving chamber below the offset portion through which the lateral projection moves for delivering a descending blow on the animal, and means in the chamber connected with the retaining means and adapted to be actuated by the animal for causing release of the retaining means, the casing being provided with an entrance.

6. In an animal trap having a rotatable striking arm, a shaft having an end connected to the arm and a spring for actuating the arm, a dash pot including a stationary cylinder having a closed bottom and an open upper end, a piston in the cylinder, a rod rigidly connected with the piston projecting through the open end of said cylinder, and provided with an enlargement having a horizontal slot, a crank arm depending from the other end of the shaft and having a finger projecting into the horizontal slot, means for retaining the arm in an inoperative position, said arm when released adapted to descend rapidly for striking an animal, the piston being moved upwardly by the pin when the spring-actuated arm descends, the rod and piston being moved downwardly by the pin when the arm moves on its up stroke towards its inoperative position thereby causing the piston to descend in the cylinder and compress air therein for retarding the up stroke of said arm.

SAMUEL J. EVANS.